United States Patent [19]

Watanabe

[11] Patent Number: 4,480,694

[45] Date of Patent: Nov. 6, 1984

[54] METHOD FOR ACIDIZING HIGH TEMPERATURE SUBTERRANEAN RESERVOIRS

[75] Inventor: David J. Watanabe, Orange, Calif.

[73] Assignee: Union Oil Company of California, Los Angeles, Calif.

[21] Appl. No.: 453,503

[22] Filed: Dec. 27, 1982

[51] Int. Cl.$^3$ ............................................. E21B 43/27
[52] U.S. Cl. ................................. 166/300; 166/307
[58] Field of Search .......... 166/270, 271, 300, 305 R, 166/307

[56] References Cited

U.S. PATENT DOCUMENTS

| | | | |
|---|---|---|---|
| 3,905,553 | 9/1975 | Bradley et al. | 166/305 R X |
| 4,148,360 | 4/1979 | Watanabe | 166/300 |
| 4,203,492 | 5/1980 | Watanabe | 166/300 |
| 4,267,887 | 5/1981 | Watanabe | 166/300 |
| 4,320,014 | 3/1982 | Vivian | 166/300 X |

FOREIGN PATENT DOCUMENTS 2054011  2/1981  United Kingdom .

OTHER PUBLICATIONS

Hubbard, Marvin G., "Atomization of Treating Fluids With Nitrogen", API Production Division Spring Meeting, Mar. 20 to 22, 1968.

*Primary Examiner*—George A. Suchfield
*Attorney, Agent, or Firm*—Dean Sandford; Gregory F. Wirzbicki; Gerald L. Floyd

[57] ABSTRACT

Subterranean reservoirs having temperatures above about 250° F. are acidized by atomizing an acid precursor in an anhydrous gas to form a mist, mixing the mist with water in the borehole of a well penetrating the reservoir to form a treating fluid comprising a dispersion of fine particles of acid precursor and anhydrous gas in water, and injecting the treating fluid into the reservoir. The acid precursors are normally liquid halogenated hydrocarbons which hydrolyze in the presence of water to generate a hydrohalic acid.

24 Claims, No Drawings

METHOD FOR ACIDIZING HIGH TEMPERATURE SUBTERRANEAN RESERVOIRS

BACKGROUND OF THE INVENTION

1. Field of the Invention

This invention relates to a method for treating a subterranean reservoir penetrated by a well, and more particularly concerns a method for more uniformly acidizing relatively high temperature subterranean reservoirs penetrated by a well.

2. Description of the Prior Art

Acidizing of wells is a well-known process for increasing or restoring the permeability of subterranean reservoirs to thereby facilitate the flow of reservoir fluids, such as oil, gas or geothermal fluid, into the well from the reservoir, and also to facilitate the injection of fluids through the well into the reservoir. Acidization involves treating the reservoir with an acid in order to dissolve the reservoir rock itself or clogging deposits, such as carbonate scale and siliceous deposits, thereby opening pores and other flow channels and increasing the permeability of the reservoir.

Numerous acidization methods have been proposed to cope with varying well conditions and special reservoir problems. However, in recent years the increased activity in drilling very deep oil and gas wells and geothermal wells has outpaced the development of suitable acidization methods, primarily due to the high temperature of these reservoirs.

A problem common to many prior art acidization processes is the corrosion of the well equipment, particularly the downhole tubing and casing, which is exposed to the acidizing fluid. Because the reactivity of an acid is significantly increased at higher temperatures, the corrosion of well equipment is especially serious in the acidization of high temperature reservoirs.

Corrosion inhibitors are generally incorporated into the acidizing fluid prior to its injection into the well. However, the effectiveness of the known corrosion inhibitors decreases at higher temperatures, and the expense of the corrosion inhibitors, which are significant even at low temperatures, become prohibitive at temperatures above about 250° F. Another difficulty with the known corrosion inhibitors, especially when used in the large quantities required in high temperature wells, is their tendency to form insoluble solids upon reaction with reservoir materials, thereby damaging the reservoir.

Another problem in the acidization of high temperature reservoirs is that the acid is rapidly consumed by the reactive material immediately adjacent the borehole before the acid can penetrate any significant distance into the reservoir. Without adequate reservoir penetrations, the acidization operation is of little value. In view of these problems, many prior art acidization methods are limited, as a practical matter, to the acidization of reservoirs having temperatures on the order of 250° F. and less.

The aforementioned problems have been overcome to a large extent by the use of methods disclosed in my U.S. Pat. Nos. 4,180,360, 4,203,492, and 4,267,887 wherein a substantially anhydrous acid precursor is injected into the reservoir and is allowed to hydrolyze in situ to generate a hydrohalic acid. In the last of the aforementioned patents there is described a well treatment, especially suitable for treating hot dry gas wells which do not contain water, wherein there is injected down an injection tubing a treating fluid, comprising a foam of an acid precursor, a gas and a foaming agent, while water is injected either along with the treating fluid down the same injection tubing as a plurality of small, discrete slugs or simultaneously down the injection tubing-casing annulus. The treating fluid and the water mix in the borehole and the resulting mixture then passes out into the reservoir.

There are several objectives in using acid precursors to treat high temperature reservoirs. First, the acid precursor should not hydrolyze to form an acid to any great extent during its passage through the well equipment in order to avoid corrosion of the well equipment. Second, the acid precursor should begin to hydrolyze as soon as possible after it enters the reservoir so as to increase the permeability of the reservoir in the critical area in the immediate vicinity of the borehole. Third, the acid precursor should not completely hydrolyze until the treating fluid has been injected a substantial radial distance out into the reservoir so as to increase reservoir permeability a substantial distance away from the borehole. Fourth, in order to accelerate the rate of hydrolysis these two immiscible phases which have different densities, i.e., acid precursor and water, should be intimately mixed together so as to maximize their interfacial area of contact and minimize their gravity segregation.

While the above-described methods for acidization utilizing acid precursors have proven quite useful in treating many high temperature reservoirs, there exists a need for a further improved acidization treatment, especially such a treatment wherein the permeability in the immediate vicinity of the borehole is substantially improved.

Accordingly, it is a primary object of this invention to provide a method for acidizing high temperature subterranean reservoirs utilizing acid precursors.

It is another object to provide such a method wherein the permeability of the reservoir in the immediate vicinity of the borehole is improved.

It is a further object to provide such a method utilizing as a treating fluid an intimate mixture of an acid precursor and water.

It is a still further object to provide such a method wherein the interfacial area of contact between the acid precursor and the water is increased.

It is yet another object of the invention to provide such a method wherein the rate of hydrolysis of the acid precursor is increased by decreasing the particle size of the acid precursor in a treating fluid.

Other objects, advantages and features of the invention will become apparent to those skilled in the art from the following description and appended claims.

SUMMARY OF THE INVENTION

Briefly, the invention provides an improved method for acidizing subterranean reservoirs having temperatures above about 250° F., such as between 250° F. and 700° F., wherein there is introduced into the reservoir through a well penetrating the reservoir a treating fluid comprising a dispersion in water of a mist of an acid precursor in an anhydrous gas. The acid precursor is then allowed to hydrolyze in situ to generate a hydrohalic acid which reacts to increase the permeability of the reservoir.

The mist is formed by atomizing an acid precursor into an anhydrous gas. The smaller the particle size of the acid precursor in the mist and in the treating fluid, the greater the rate of hydrolysis of the acid precursor. Treating fluids having a higher rate of hydrolysis of the acid precursor are often more effective in treating reservoirs at the lower end of the high temperature range, for example, from about 250° to 400° F., especially in the area of the reservoir adjacent the borehole.

The mist of acid precursor in anhydrous gas may be formed at the surface of the ground and injected down the well via a conduit which is separate from the conduit used to carry the water to the bottom of the well. Alternatively, the acid precursor and the anhydrous gas may be injected down the well via two separate conduits and mixed downhole near the bottom of the well to form the mist before being further mixed with separately injected water to form the treating fluid.

The acid precursor, which hydrolyzes in the presence of water to generate a hydrohalic acid, is a normally liquid, halogenated hydrocarbon, generally termed a non-acidic organic material, having the generalized formula:

$$C_wH_yX_z,$$

wherein w is an integer between 1 and about 5, y is equal to $(2w+2)-z$, z is an integer between 1 and $(2w+2)$ and X is a halogen selected from the group consisting of chlorine, fluorine, bromine, iodine and mixtures thereof, with the compound or compounds selected being thermally stable under the high temperature and pressure conditions to which it is exposed prior to its hydrolysis in the water.

DETAILED DESCRIPTION OF THE INVENTION

The method of this invention is suitable for the acidization of relatively high temperature subterranean reservoirs and finds particular utility in the acidization of subterranean reservoirs having a temperature on the order of 250° F. and higher, and especially from 250° F. to 700° F. By proper selection of acid precursors described more fully hereinbelow, the method of this invention is suitable for acidizing subterranean formations containing carbonate materials, such as limestone and dolomite, siliceous materials, such as sandstone and clay, and other acid-soluble formation constituents.

The acidization is carried out using a treating fluid comprising a mixture of water and a mist of an acid precursor and an anhydrous gas. More particularly, this invention is suitable for controlling the rate of hydrolysis of an acid precursor in a treating fluid. One factor affecting the rate of hydrolysis is the reservoir temperature. All other things being equal, the higher the temperature of the reservoir, the higher the rate of hydrolysis. Another factor affecting the rate of hydrolysis is the unit interfacial area of contact between the acid precursor and the water in the treating fluid. All other things being equal, the greater the unit interfacial area of contact between these two immiscible liquids, the higher the rate of hydrolysis. Thus, it is evident that to uniformly acidize both a relatively hot high temperature reservoir (near 700° F.) and a relatively cool high temperature reservoir (near 250° F.), it is necessary to increase the unit interfacial area of contact between the acid precursor and the water in the treating fluid used to treat the relatively cool high temperature reservoir as compared to the treating fluid used to treat the relatively hot high temperature reservoir. As will be explained more fully hereinbelow, the unit interfacial area of contact between the acid precursor and the water is controlled by the degree of atomization of the acid precursor in the mist of acid precursor in an anhydrous gas. That is, the smaller the particles of acid precursor in the mist, the higher the unit interfacial area of contact between the acid precursor and the water in the treating fluid.

The acid precursors suitable for use in the method of this invention are normally liquid, halogenated hydrocarbons, generally termed non-acidic organic materials, having the generalized formula:

$$C_wH_yX_z,$$

wherein w is an integer between 1 and about 5, y is equal to $(2w+2)-z$, z is an integer between 1 and $(2w+2)$, and X is a halogen selected from the group consisting of chlorine, fluorine, bromine, iodine and mixtures thereof, with the compound or compounds selected being thermally stable under the high temperature and pressure conditions to which it is exposed prior to its hydrolysis in water. As used herein, the term "thermally stable" is meant to distinguish over and exclude compounds which decompose prior to hydrolysis and/or polymerize under the temperature and pressure conditions encountered during acidizing. Halogenated hydrocarbons which thermally decompose under the conditions encountered prior to hydrolysis should be avoided since the resulting decomposition products, such as chlorine or fluorine, are highly toxic, and decomposition/pyrolysis products, for example, tars, tend to form difficult-to-remove deposits on the well casing, pipe and equipment.

The term "normally liquid" as used herein is meant to include those compounds which exist as liquids under the ambient temperature and pressure conditions at the well site. In general, a compound which is "normally liquid" for the purposes of this invention has a normal melting point less than about 80° F. and preferably less than about 30° F. and has a normal boiling point above about 80° F. and preferably above about 170° F. Normally liquid compounds are more easily handled at the well site than are solids and are volumetrically more efficient to use than are gases. Accordingly, the term "normally liquid" ordinarily excludes compounds which exist as a solid or a gas under the expected temperatures and pressures to which the compounds are to be exposed before or during hydrolysis. However, even though use of "normally liquid", halogenated hydrocarbon acid precursor compounds is preferred, use of solid or gaseous acid precursors is not excluded from the present method and is within the scope of the invention.

Furthermore, the treating fluid should consist essentially of an acid precursor or mixtures of more than one acid precursor, an anhydrous gas and water, and should not contain other materials which would adversely affect the hydrolysis rate of the acid precursor or which would form undesirable decomposition and/or pyrolytic products. The acid precursor should be anhydrous so that essentially no hydrolysis thereof occurs until it mixes with water at the bottom of the well. Use of oxygen-containing compounds, including hydrocarbon compounds such as alcohols or ketones, should preferably be avoided, since at the high reservoir temperatures expected to be encountered these compounds tend to be corrosive even in an anhydrous state. Since unsaturated hydrocarbons having double or triple carbon bonds bomb, through a cooling coil, through a back pressure regulator and into a collection vessel. A constant amount of ethanol amine is pumped into the treating fluid as it leaves the reactor vessel to neutralize the hydrochloric acid formed and prevent corrosion of the downstream tubing. Samples from the collection vessel are periodically taken, titrated, the amount of ethanol amine added taken into account, and the time for 25 percent, 50 percent and 100 percent conversion of the tetrachloromethane to hydrochloric acid calculated. The results are summarized in the Table and show that when using finely atomized particles of tetrachloromethane, the conversion to hydrochloric acid is rapid and increases in rate with an increase in temperature.

TABLE

CONVERSION OF TETRACHLOROMETHANE TO HYDROCHLORIC ACID

| Example | Temperature (°F.) | Conversion (%) | Time for Conversion to Acid (minutes) |
|---|---|---|---|
| 1 | 325 | 100 | 26.8 |
| 2 | 325 | 50 | 5.5 |
| 3 | 325 | 25 | 4.5 |
| 4 | 350 | 100 | 15.5 |
| 5 | 350 | 50 | 3.2 |
| 6 | 350 | 25 | 1.4 |
| 7 | 375 | 100 | 8.8 |
| 8 | 375 | 50 | 1.8 |
| 9 | 375 | 25 | 0.8 |

EXAMPLE 10

An Alabama gas well is completed in a tight dolomite reservoir and has a bottom hole temperature of 325° F. The well is equipped with 7 inch casing set from the surface to 18,452 feet, 2⅜ inch tubing extending to 18,735 feet, a packer set at 18,700 feet, and a 5 inch liner set from 17,846 to 18,866 feet. The casing is perforated over the interval of 18,777 to 18,796 feet with 0.375 inch perforations, 2 perforations per foot of depth. Prior to treatment this well is shut in because of declining productivity when gas and condensate production drop to 115 cubic feet and ½ barrel per day respectively. A conventional acidizing treatment using hydrochloric acid is unsuccessful in substantially increasing the production rate of the well. This failure is believed due to the hydrochloric acid spending in the hot reservoir near the borehole before it penetrates any substantial distance. It is desired to acidize the reservoir surrounding this well using an acid precursor so as to achieve deep acid penetration into the reservoir. At the same time, it is desired to accelerate the hydrolysis of the acid precursor during the treatment so that the reservoir in the immediate vicinity of the borehole of this well whose temperature is at the low end of the high temperature range is adequately acidized. First there is pumped down the tubing is a preflush 3,150 gallons of water containing 1 percent by weight of ammonium chloride and 1,000 SCF per barrel nitrogen to establish that fluid can be injected into the well. Next, tetrachloromethane is pumped down the tubing through a T in the tree-saver in the wellhead into a stream of nitrogen to form a mist of 5,700 gallons of 96 microns sized particles of tetrachlormethane atomized in 170 SCF per gallon of nitrogen. Simultaneously there is pumped down the annulus 36,651 gallons of fresh water. This combination of tetrachloromethane and water is pumped at the total average rate of 3.4 barrels per minute under a maximum pressure of 12,100 pounds per square inch, and is calculated upon hydrolysis to generate about 2,000 gallons of 20 percent by weight aqueous solution of hydrochloric acid per foot of perforations. Next there is pumped down the tubing 420 gallons of water containing 1 percent by weight of ammonium chloride and 1,000 SCF per barrel nitrogen as an afterflush. This is followed by 200 gallons of condensate with 1,000 SCF per barrel nitrogen and then 85 barrels of nitrogen gas to flush the treating fluid out of the borehole and into the reservoir. The well is shut in for 7 days and then opened up to the flare pit. It starts to produce small amounts of gas, condensate and water. For the next 9 days nitrogen is injected to the bottom of the well via coiled tubing to gas lift the treating fluids out of the wall. After this time the well begins to flow on its own. The well is connected to a high pressure (650 to 750 pounds per square inch) production gathering system and produces 30,000 cubic feet per day gas and 50 barrels per day condensate.

While various specific embodiments and modifications of this invention have been described in the foregoing specification, further modifications will be apparent to those skilled in the art. Such further modifications are included within the scope of this invention as defined by the following claims.

Having now described my invention, I claim:

1. A method for acidizing a subterranean reservoir having a temperature above about 250° F., which comprises:
   (a) introducing a treating fluid through a well into said reservoir, said treating fluid comprising a dispersion of (1) a mist of an acid precursor having a particle size of less than about 10,000 microns and an anhydrous gas in (2) water, and
   (b) allowing said acid precursor to hydrolyze in situ to generate a hydrohalic acid which reacts to increase the permeability of the said reservoir.

2. The method defined in claim 1 wherein the acid precursor is one or more normally liquid acid precursors having the generalized formula:

$$C_w H_y X_2,$$

wherein w is an integer between 1 and about 5, y is equal to (2w+2), and X is a halogen selected from the group consisting of chlorine, fluorine, bromine, iodine and mixtures thereof.

3. The method defined in claim 2 wherein said acid precursor is tetrachloromethane.

4. The method defined in claim 2 wherein said acid precursor is a mixture of tetrachloromethane and 1,1,2-trichlorotrifluoroethane.

5. The method defined in claim 1 wherein said anhydrous gas is nitrogen.

6. The method defined in claim 1 wherein the mist of an acid precursor and an anhydrous gas is formed at the surface of the ground.

7. The method defined in claim 1 wherein the mist of an acid precursor and an anhydrous gas is formed in the borehole of the well.

8. The method defined in claim 1 wherein the mist of the acid precursor in an anhydrous gas and the water are introduced into the well through separate conduits.

9. The method defined in claim 1 wherein the mist contains about 0.1 to 20 volumes of anhydrous gas per volume of acid precursor at downhole conditions of temperature and pressure.

10. The method defined in claim 1 wherein the treating fluid contains about 3 to 50 gallons of water per gallon of acid precursor.

11. A method for acidizing a subterranean reservoir having a temperature above about 250° F. consisting essentially of:
   (a) atomizing an acid precursor into a stream of anhydrous gas to form a mist of acid precursor having a particle size of less than about 1,000 microns in the anhydrous gas,
   (b) mixing said mist with water in the borehole of a well penetrating said reservoirs to form a treating fluid consisting essentially of a dispersion of particles of acid precursor and anhydrous gas in water,
   (c) injecting said dispersion into the reservoir surrounding the well, and
   (d) shutting in the well to allow the acid precursor to hydrolyze in situ to generate a hydrohalic acid which reacts to increase the permeability of the reservoir.

12. The method defined in claim 11 wherein the acid precursor is one or more normally liquid acid precursors having the generalized formula:

$$C_wH_yX_2,$$

wherein w is an integer between 1 and about 5, y is equal to (2w+2), and X is a halogen selected from the group consisting of chlorine, fluorine, bromine, iodine and mixtures thereof.

13. The method defined in claim 12 wherein said acid precursor is tetrachloromethane.

14. The method defined in claim 12 wherein said acid precursor is a mixture of tetrachloromethane and 1,1,2-trichlorotrifluoroethane.

15. The method defined in claim 11 wherein said anhydrous gas is nitrogen.

16. The method defined in claim 11 wherein the mist of an acid precursor and an anhydrous gas is formed at the surface of the ground.

17. The method defined in claim 11 wherein the mist of an acid precursor and an anhydrous gas is formed in the borehole of the well.

18. The method defined in claim 11 wherein the mist of the acid precursor in an anhydrous gas and the water are introduced into the well through separate conduits.

19. The method defined in claim 11 wherein the mist contains about 0.1 to 20 volumes of anhydrous gas per volume of acid precursor at downhole conditions of temperature and pressure.

20. The method defined in claim 11 wherein the treating fluid contains about 3 to 50 gallons of water per gallon of acid precursor.

21. A method for acidizing a subterranean reservoir having a temperature of about 250° to 400° F., consisting essentially of:
   (a) introducing into the borehole of a well penetrating the reservoir through separate conduits a stream of tetrachloromethane and a stream of an anhydrous gas to form in the borehole a mist of particles of tetrachloromethane having a diameter of less than about 1,000 microns in the anhydrous gas,
   (b) introducing into the borehole of the well through still another separate conduit a stream of water to form in the borehole a treating fluid consisting essentially of a dispersion of particles of tetrachloromethane and anhydrous gas in water,
   (c) after the tetrachloromethane begins to hydrolyze, injecting the treating fluid into the reservoir surrounding the well, and
   (d) shutting in the well to allow the tetrachloromethane to hydrolyze completely in situ to generate a hydrohalic acid which reacts to increase the permeability of the reservoir.

22. The method defined in claim 21 wherein said anhydrous gas is nitrogen.

23. The method defined in claim 21 wherein the mist contains about 0.1 to 20 volumes of anhydrous gas per volume of tetrachloromethane at downhole conditions of temperature and pressure.

24. The method defined in claim 21 wherein the treating fluid contains about 3 to 50 gallons of water per gallon of tetrachloromethane.

* * * * *